United States Patent [19]
Zmyslowski

[11] Patent Number: 6,062,124
[45] Date of Patent: May 16, 2000

[54] BRAKE BOOSTER

[75] Inventor: Mark Zmyslowski, Grosse Pointe Shores, Mich.

[73] Assignee: Radar Industries Inc.

[21] Appl. No.: 09/070,065

[22] Filed: Apr. 30, 1998

[51] Int. Cl.[7] .................................................... F01B 7/00
[52] U.S. Cl. ................................ 92/63; 92/98 R; 92/128; 403/348; 29/888.06
[58] Field of Search .................................. 92/63, 94, 96, 92/98 R, 130 R, 130 A, 128; 29/521, 888, 6; 403/348, 349

[56] References Cited

U.S. PATENT DOCUMENTS

| | | | |
|---|---|---|---|
| 4,574,455 | 3/1986 | Kytta | 29/445 |
| 4,850,263 | 7/1989 | Rumsey et al. | 92/63 |
| 5,285,716 | 2/1994 | Thompson | 92/63 |
| 5,311,809 | 5/1994 | Choinski et al. | 92/63 |
| 5,560,280 | 10/1996 | Rumsey | 92/63 X |
| 5,725,076 | 3/1998 | Pierce et al. | 188/170 |
| 5,799,564 | 9/1998 | Pierce | 92/63 X |

*Primary Examiner*—Hoang Nguyen
*Attorney, Agent, or Firm*—Young & Basile, PC

[57] ABSTRACT

A pneumatic booster for use in association with heavy duty truck brakes including an emergency mechanism whereby the brakes are automatically applied in the event of a pneumatic system failure. An intermediate housing portion of the booster, typically provided as a heavy and complicated casting, is provided as a composite stamping comprising front and rear stampings held together by a series of clinch joints.

12 Claims, 8 Drawing Sheets

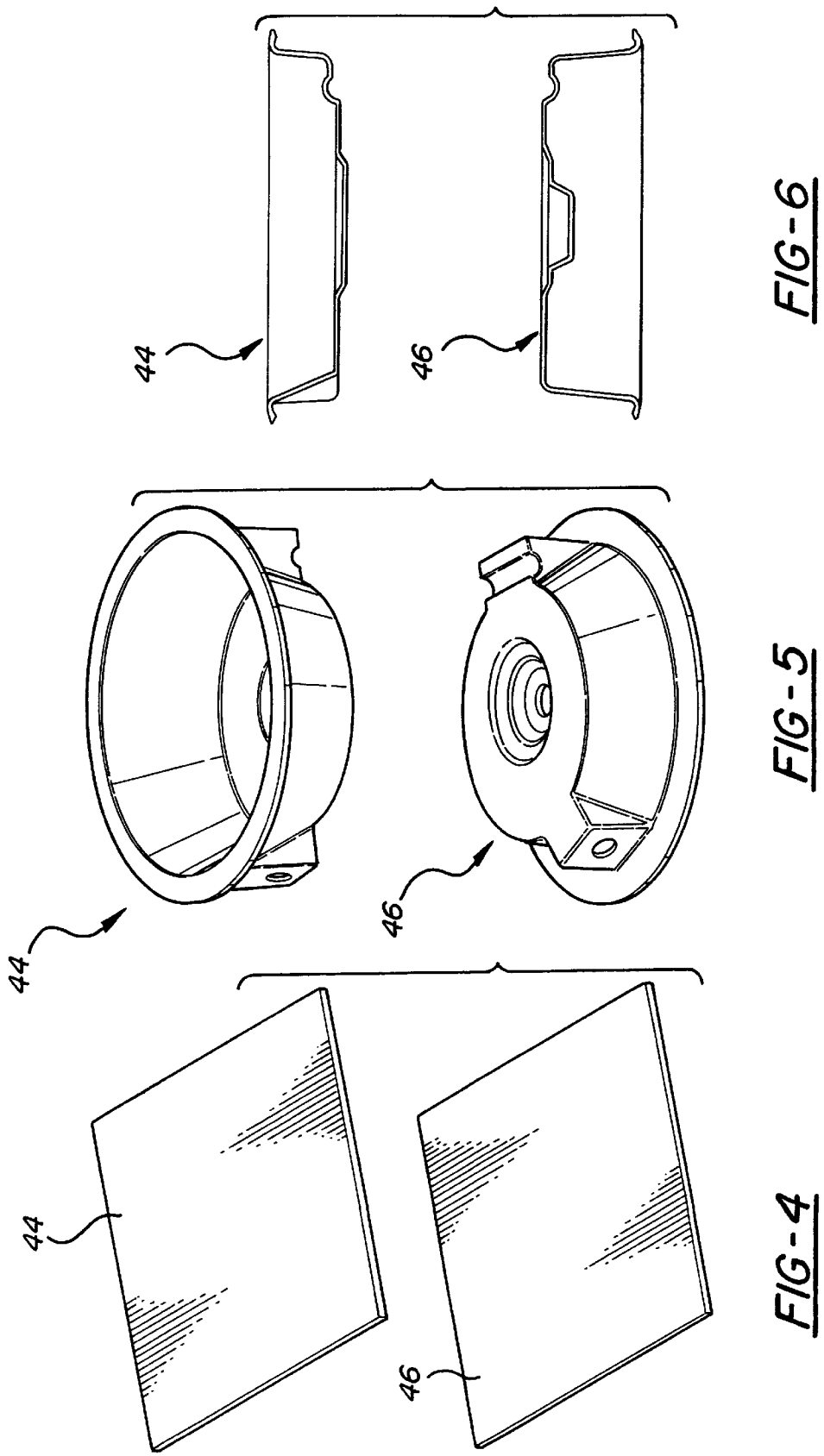

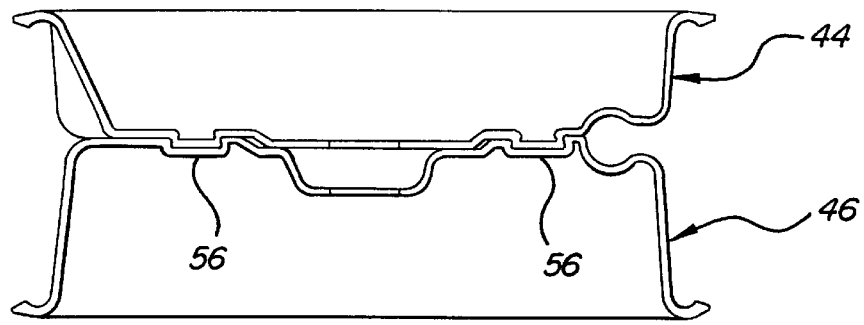
FIG-10
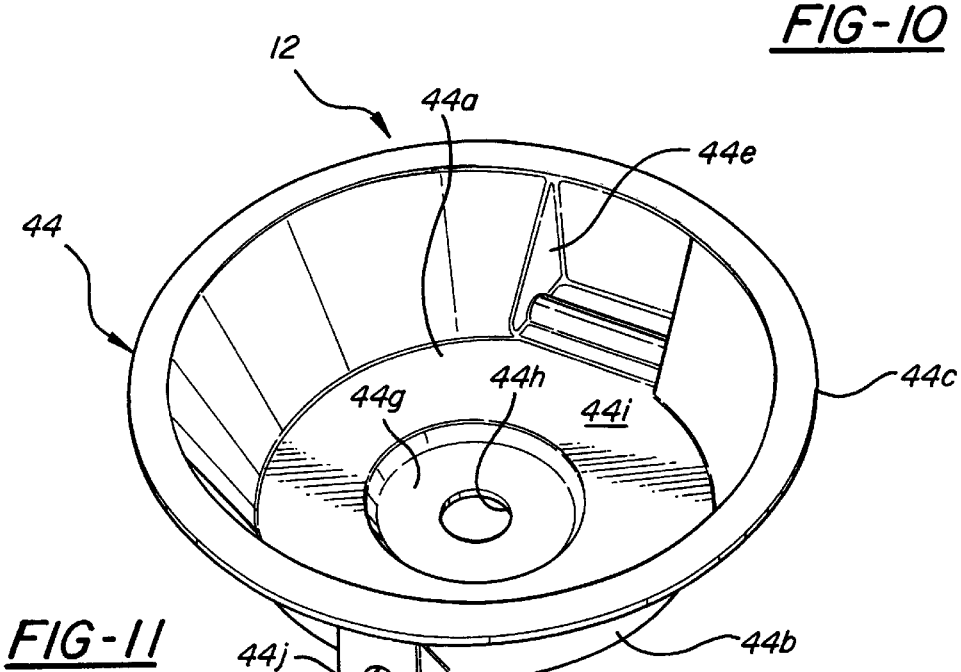
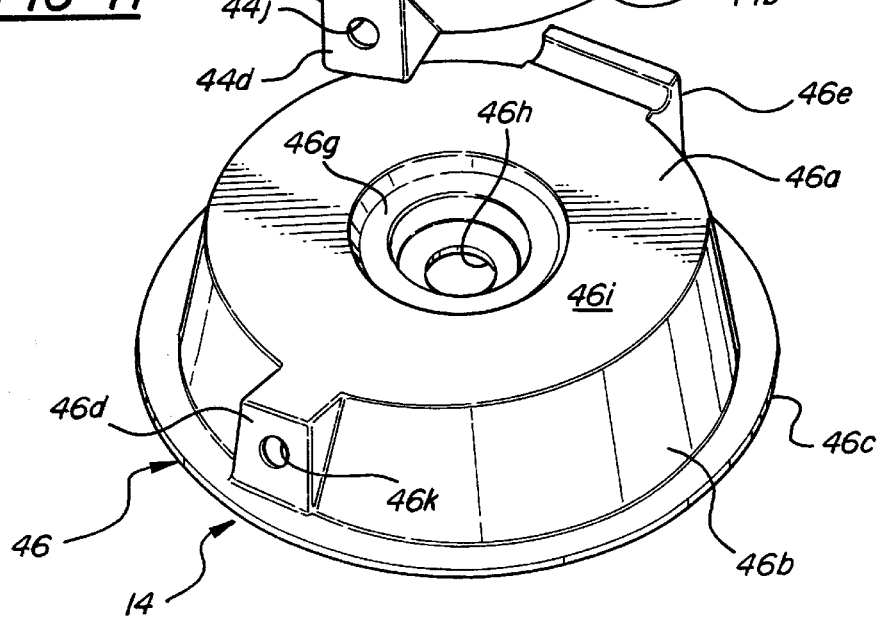
FIG-11

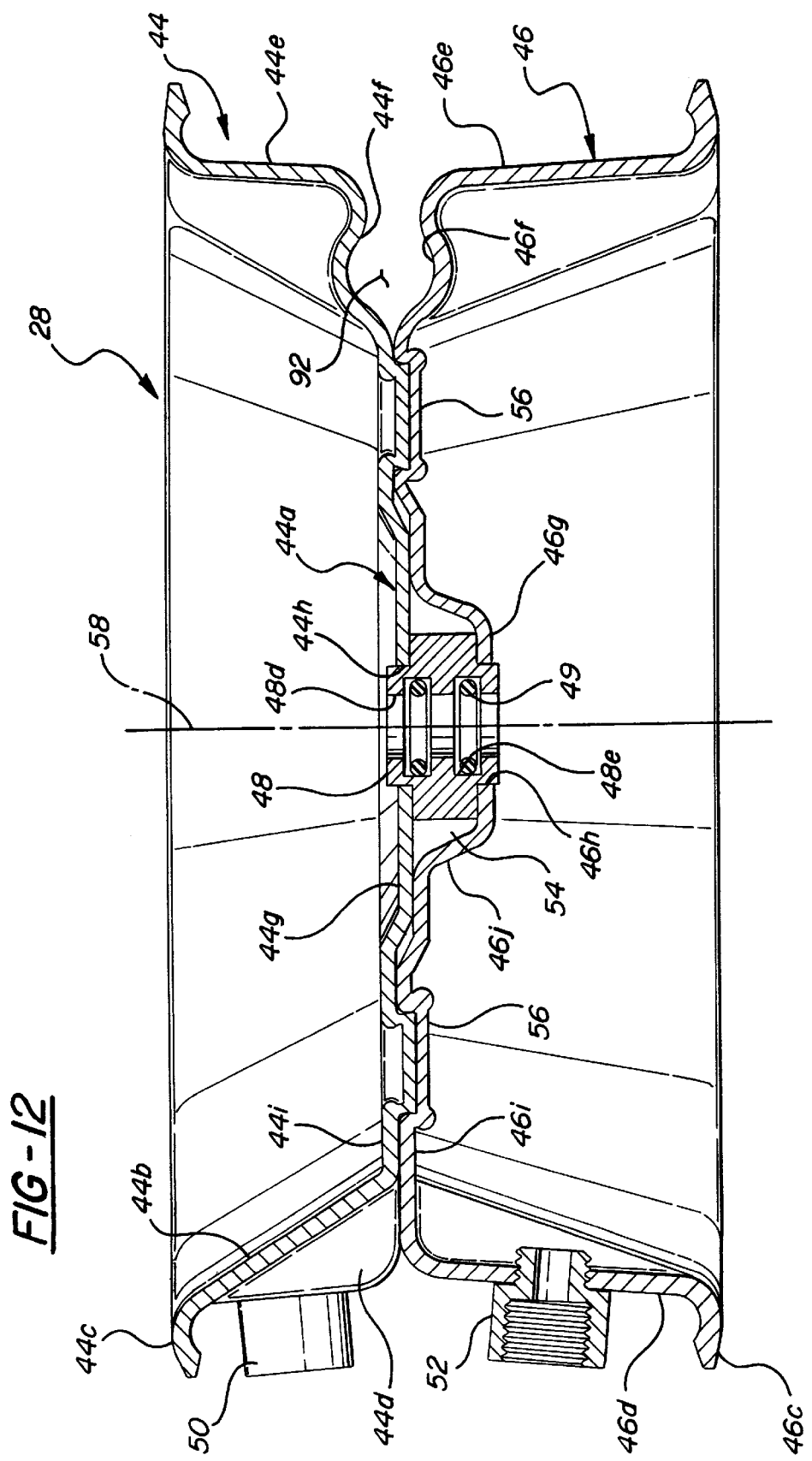

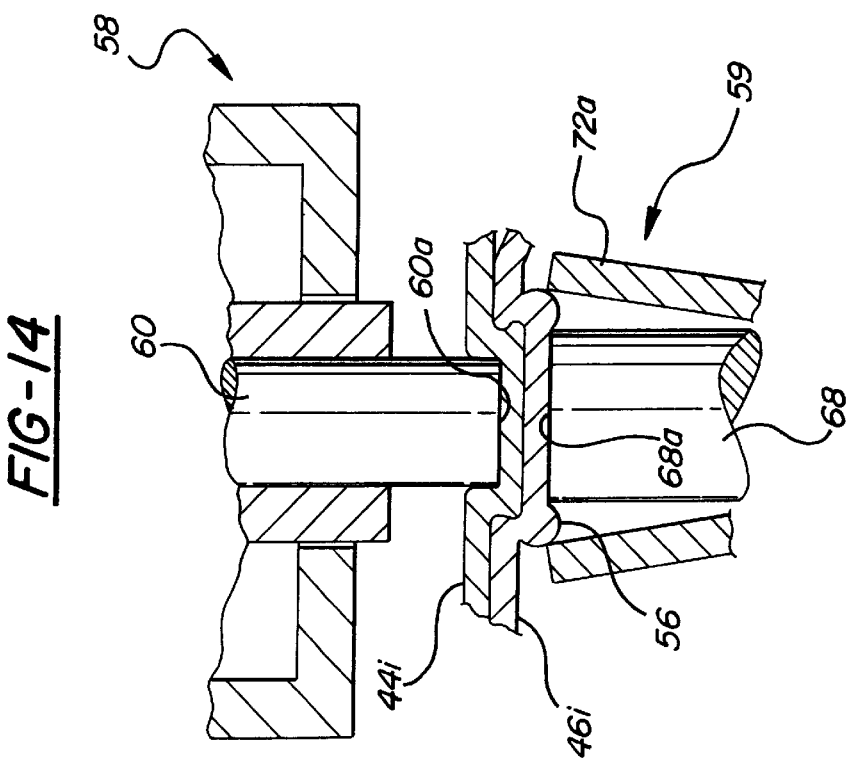
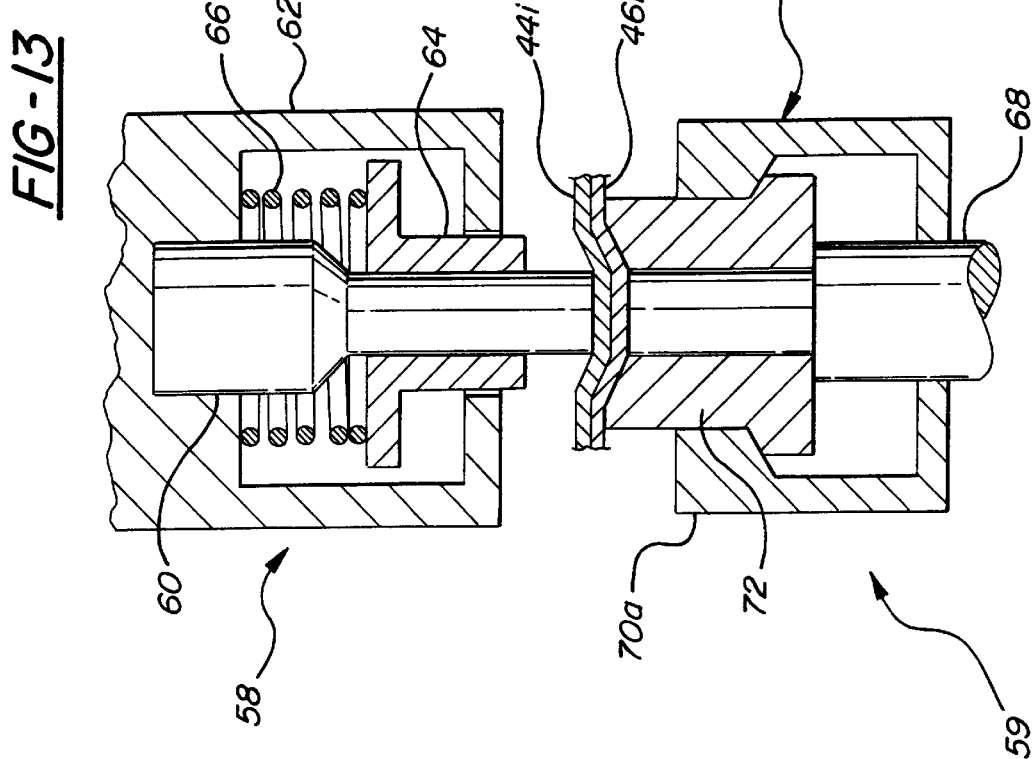

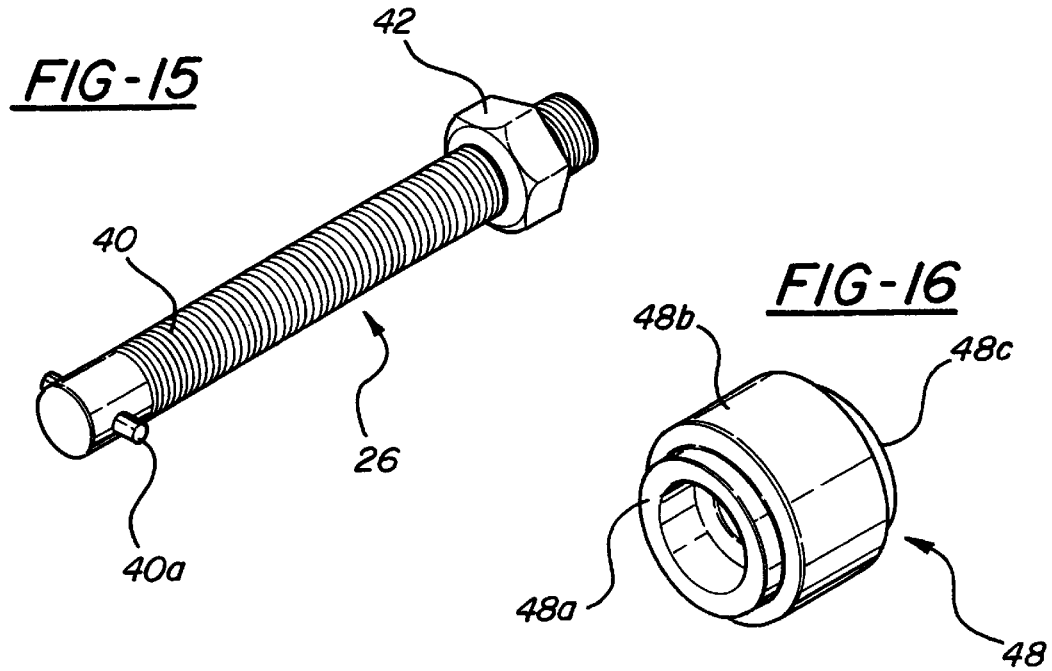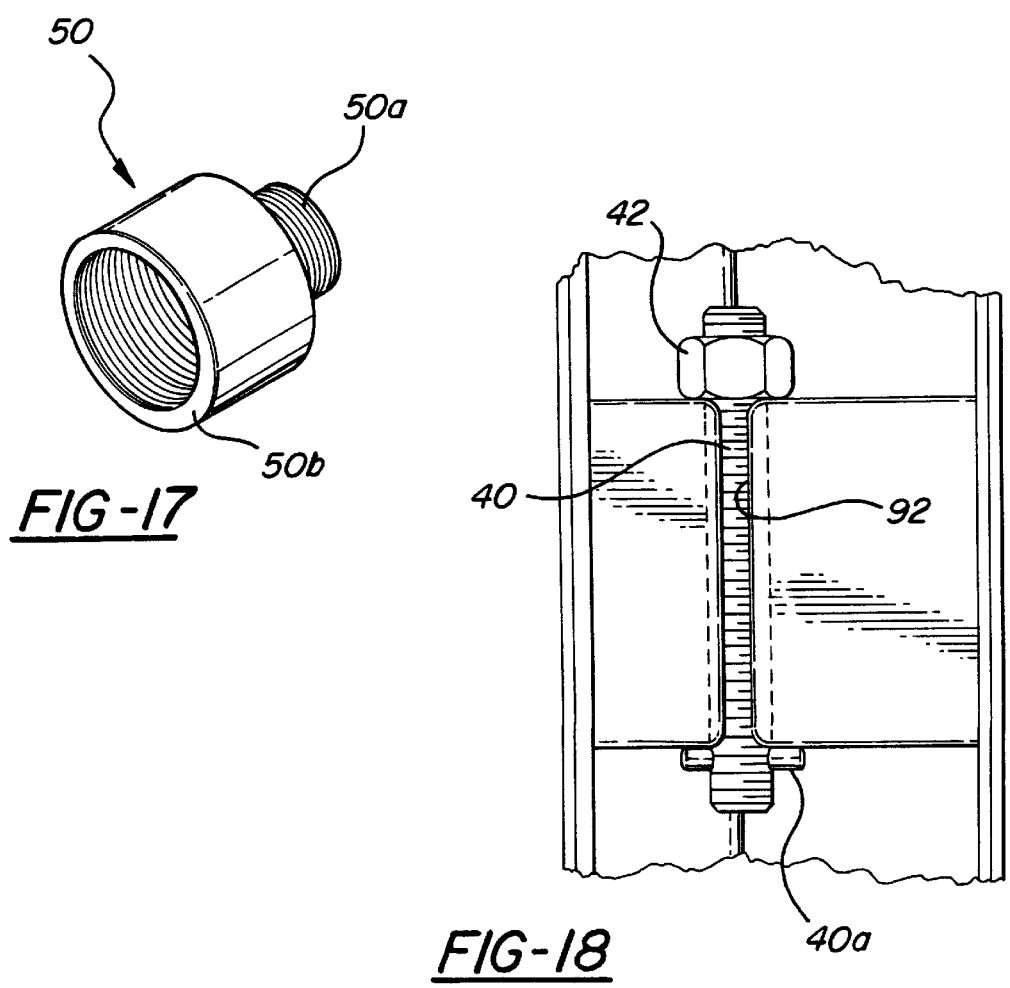

BRAKE BOOSTER

BACKGROUND OF THE INVENTION

This invention relates generally to pneumatic braking systems such as used on trucks and trailers and more particularly to a pneumatic brake booster incorporating an emergency fail safe mechanism.

A typical brake booster, as shown for example in U.S. Pat. No. 3291004, includes a housing having an actuator rod for coupling to the vehicle brakes. The booster incorporates a heavy duty diaphragm for moving the actuator rod in response to pressurized air received on one side of the diaphragm. The actuator rod is resiliently positioned against the opposite side of the diaphragm so that when the diaphragm is moved in response to pressurized air the actuator rod will actuate the brake drums and when the pressurized air is exhausted the actuator rod will release the brake drums. The housing further includes a second or emergency chamber disposed to the rear of the booster. The second chamber incorporates a second heavy duty diaphragm to the rear of which there is disposed a powerful emergency spring. An emergency rod is disposed between the first and second diaphragm such that when the powerful emergency spring is released the emergency rod urges the first diaphragm forwardly and thus actuates the actuator rod to set the brakes. The emergency spring is only released to set the brakes in the event that the pressurized air is deliberately released to set the brakes in a park mode or in the event of inadvertent loss of air pressure in the forward portion of the second chamber such as might result from a leak in the pneumatic line or failure of the compressor to operate. Whereas a booster of this type is generally satisfactory the known designs of this type are relatively heavy and relatively costly to produce.

SUMMARY OF THE INVENTION

This invention is directed to the provision of an improved brake booster;

More specifically this invention is directed to the provision of a brake booster incorporating an emergency fail safe mechanism and which is of lightweight, simple and inexpensive construction.

The brake booster of the invention is of the type including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housings; a bearing plate positioned in the rear housing having a rear face receiving a forward end of the emergency spring and a forward face bearing against the rear face of the rear diaphragm; an emergency brake actuator rod having a front end positioned forwardly of the central partition for coaction with a rear face of the front diaphragm, a rear end bearing against a forward face of the rear diaphragm, and an intermediate portion passing slidable through a central aperture in the central partition; and a return spring positioned between the central partition and the rear diaphragm in surrounding relation to the emergency brake actuator rod.

According to the invention, the intermediate housing comprises a cup shaped front sheet metal stamping having a front base portion including a central aperture and a front rim portion in surrounding relation to the front base portion; a cup shaped rear sheet metal stamping having a rear base portion including a central aperture and a rear rim portion in surrounding relation to the base portion; and means securing the base portions together in confronting relation to form the intermediate housing with the base portions coacting to define the central partition of the intermediate housing. This construction for the intermediate housing simplifies the construction of the booster and significantly reduces the cost of the booster, both without sacrifice of booster performance or booster durability.

According to a further feature of the invention, the base portions are secured together by a plurality of clinch joints. This specific means of securing the base portions together provides an inexpensive and yet extremely effective means for fixedly securing the front and rear stampings together to provide the intermediate housing including the central partition.

According to a further feature of the invention, the clinch joints are arranged in a generally circular configuration centered on the base portion apertures and having a diameter sized to pilot the front end of the return spring. This arrangement allows the clinch joints to serve the further feature of accurately piloting the front end of the return spring.

According to further feature of the invention, the booster further includes a bushing sized to slidable receive the emergency brake actuator rod and the bushing is positioned in the central apertures in the base portions of the stampings. This arrangement provides a smooth operation of the booster while retaining the necessary sealing at the partition of the intermediate housing.

According to further feature of the invention, the base portions have a cross-sectional configuration such that, when positioned in confronting relation, a central region of the front stamping in surrounding relation to the base portion of the front stamping central aperture is positioned in axially spaced relation to a central region of the rear stamping in surrounding relation to the rear stamping base portion central aperture, and annular regions of the front and rear stamping base portions outwardly of the central regions are contiguous; the bushing spans the axial space between the central regions of the stamping; and the clinch joints are provided in the contiguous annular regions. This specific cross-sectional configuration provides a relatively large axial dimension for the bushing to facilitate guiding of the emergency rod and further facilitates the clinching together of confronting regions of the front and rear stampings to provide the securement means.

According to further feature of the invention, a hole is formed in the rim portion of each of the front and rear sheet metal stampings and an annular fitting is secured in the hole in the rim portion of each stamping. This arrangement provides a simple and effective means of providing pressurized air to the chambers of the booster.

According to further feature of the invention, the booster further includes an elongated tool adapted to pass through a central aperture in the rear housing for engagement with a rear end of the bearing plate, and the front and rear stampings coact when secured together to define a transverse passage proximate the periphery of the secured together stampings extending generally perpendicular to the central axis of the booster and sized to receive and store the elongated tool. This arrangement allows the front and rear stamping to provide, without further cost beyond the basic stamping operations, a means for storing the emergency tool used to release the brakes in the event of a system failure.

The invention further provides a method of forming a motor vehicle brake booster of the described type wherein the intermediate housing is formed by the steps of shaping a first sheet of sheet metal to form a cup shaped front sheet metal stamping having a front base portion including a central aperture and a front rim portion in surrounding relation to the front base portion; stamping a second piece of sheet metal to form a cup shaped rear sheet metal stamping having a rear base portion including a central aperture and a rear rim portion in surrounding relation to the base portion; positioning the base portions in confronting relation; and securing the base portions together to form the intermediate housing with the base portions coacting to define the central partition of the intermediate housing. This methodology allows the ready formation of a lightweight and inexpensive intermediate housing for the booster to replace prior art cast housings.

According to further feature of the invention methodology, the base portions are secured together by a plurality of clinch joints. This specific method of securement avoids the need for separate fasteners and provides a firm positive securement between the front and rear housings.

BRIEF DESCRIPTION OF THE DRAWINGS

FIGS. 4–10 are schematic views showing various steps in the invention methodology;

FIG. 11 is an exploded perspective view of front and rear stampings formed in accordance with the invention;

FIG. 12 is a cross-sectional view of an intermediate housing formed in accordance with the invention;

FIGS. 13 and 14 are detail views illustrating a clinching operation employed in the formation of the invention booster;

FIG. 15 is a perspective view of a release tool assembly employed in the booster;

FIGS. 16 and 17 are perspective views, respectively, of a bushing and a fitting employed in the booster; and FIG. 18 is a detail view showing the storage of the release tool assembly.

DETAILED DESCRIPTION OF THE PREFERRED EMBODIMENT

Figure 1:
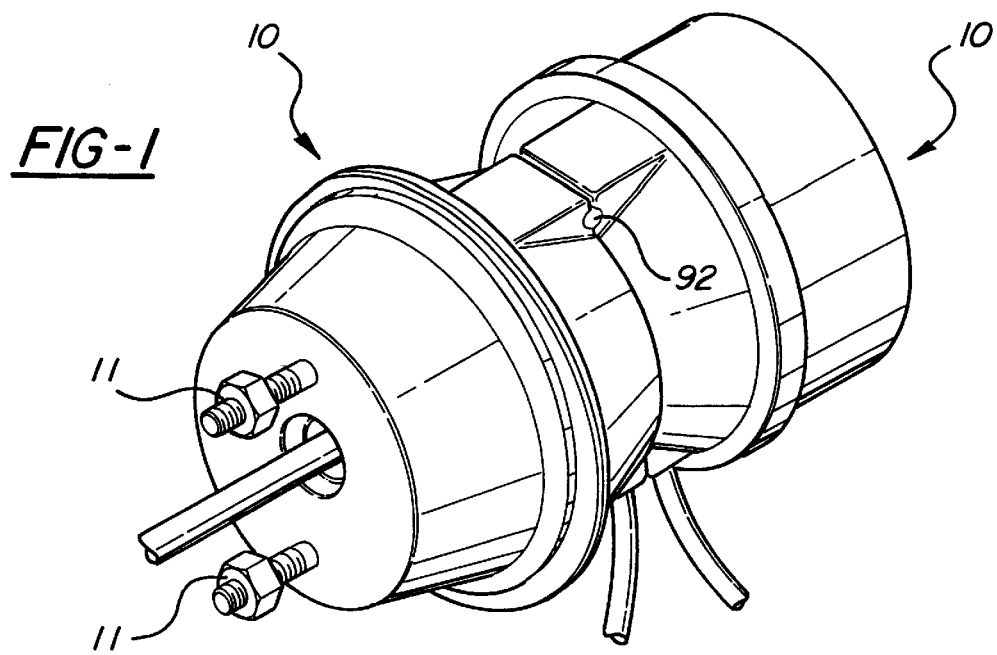
FIG. 1 is a perspective view of a brake booster according to the invention.

The booster 10 of the invention, as best seen in FIG. 1, is intended to be secured to the rear axle of an associated motor vehicle proximate the drum brake mechanism utilizing, for example, lugs 11 carried by the booster housing and is operative when actuated to provide a booster force to apply and release the vehicle brakes.

Booster 10 includes a front housing 12; a rear housing 14; a front diaphragm 16; a rear diaphragm 18; a primary brake actuator rod assembly 20; a bearing plate 22; an emergency actuator rod assembly 24; a release tool assembly 26; and a intermediate housing assembly 28.

Front housing 12 has a generally circular, cup shaped configuration including a base portion 12a, an annular conical rim portion 12b, and a flange portion 12c. Housing 12 is preferably formed of a ferrous material and is preferably formed in a stamping operation.

Rear housing 14 has a generally circular, cup shaped configuration including a base portion 14a, an annular conical rim portion 14b, and a flange portion 14c. Housing 14 is preferably formed of a ferrous material and is preferably formed in a stamping operation.

Front diaphragm 16 is formed of a suitable flexible material and has a generally circular configuration.

Rear diaphragm 18 is also formed of a generally flexible material and also has a generally circular configuration.

Primary brake actuator rod assembly 20 includes an actuator rod 30 and a plate 32 secured to the rear end of the rod.

Bearing plate 22 includes a central hub portion 22a and a flange portion 22b integral with the front end of the hub portion.

Emergency actuator rod assembly 24 includes a rod 34, a front plate 36 secured to the front end of the rod, and a rear plate 38 secured to the rear end of the rod.

Release tool assembly 26 includes a bolt 40 and a nut 42.

Intermediate housing assembly 28 includes a front stamping 44, a rear stamping 46, a bushing 48, a front plug or fitting 50, and a rear plug or fitting 52.

Front housing 44 includes a base portion 44a, a rim portion 44b, a flange portion 44c, a fitting portion 44d, and a tool holder portion 44e pressed outwardly from rim 44b, generally diametrically opposed to fitting portion 44d, and defining a lower concave surface 44f.

Base portion 44a in turn includes a depressed central portion 44g, defining a central aperture 44h, and a raised annular region 44i between rim 44b and depressed central portion 44g.

Rear stamping 46 includes a base portion 46a, a rim portion 46b, a flange portion 46c, a fitting portion 46d pressed outwardly from rim portion 46b, and a tool holder portion 46e pressed outwardly from rim portion 46b generally diametrically opposed to fitting portion 46d, and defining an upwardly opening concave surface 46f.

Base portion 46a in turn includes a depressed central region 46g defining a central aperture 46h and an annular region 46i between rim portion 46b and depressed central region 46g and separated from the central region by an annular shoulder 46j.

Bushing 48 includes a rear hub portion 48a, a main body portion 48b, and a front hub portion 48c. The bushing defines a central bore 48d defining internal annular grooves 48e receiving O-rings 49.

Fitting 50 includes an internally threaded annular main body portion 50b and a nipple portion 50a. Fitting 52 is identical to fitting 50.

The formation of intermediate housing assembly 28 is illustrated in FIGS. 4–10. Specifically, two sheet metal stampings 44, 46 are provided (FIG. 4); the stampings are subjected to a series of hits in a stamping press to form the front and rear stampings 44, 46 (FIGS. 5 and 6); the rear hub portion 48a of bushing 48 is positioned in aperture 46h in the base portion of rear housing 46 and the base portion 44a of the front housing 44 is positioned in confronting relation with the base portion of the rear housing with the aperture 44h in the base portion of the front housing receiving the front hub portion 48c of the bushing to position the main body portion 48b of the bushing in the axial space 54 defined between front stamping central region 44g and rear stamping base portion central region 46g and rear stamping base portion central region 46h (FIGS. 7 and 8); a circular series of clinch joints 56 are formed in the contiguous annular regions 44i/46i of the stampings in concentric relation to the central axis 58 of the stamping (FIGS. 9 and 10); the nipple 50a of fitting 50 is positioned in a hole 44j in the fitting portion 46d of the front stamping to position the annular threaded main body portion 50b of the fitting outwardly of the stamping; fitting 50 is welded in place on the front stamping; the nipple 52a of fitting 52 is positioned in a hole 46k in the fitting portion 46d of the rear stamping to position the threaded main body portion 52b of the fitting outwardly of the stamping; and fitting 52 is welded in place to the rear stamping.

The clinch joints 56 are provided in a clinching operation utilizing a plurality of punches (58) and a matching plurality of dies (59) arranged in a circular configuration. A punch and die set is seen in FIGS. 13 and 14. Punch 58 includes a punch pin 60, a punch retainer 62, a stripper 64, and a compression spring 66. Die 58 includes a die pin 68, a collet 70 including a plurality of circumferentially spaced finger portions 70a, and a split bushing 72.

As each clinching punch 60 is moved downwardly with respect to the respective clinching die in response to downward movement of an associated ram, the free or lower end 60a of the punch pin contacts annular region 44i of the front stamping and, with continued downward movement, causes the adjacent material of the annular regions 44i, 46i of the front and rear stampings to flow into the recess 74 defined between the upper tip 68a of die pin 68 and the upper end of 72a of bushing 72. As the punch continues downwardly, the bushing halves move radially outwardly relative to the central axis of the clinching tool under the resistance of collet fingers 70a to allow the adjacent material of regions 44i, 46i to flow radially outwardly into the annular space defined by the retreating bushing halves to form the clinch joint 56. As the ram again moves upwardly the punches are moved upwardly and the strippers 64 operate in known manner to strip the clinched part from the punches.

In the assembled relation of the various parts of the booster, the flange 12c of the front housing is juxtaposed to the flange 44c of front stamping 44 with the periphery 16a of front diaphragm 16 clamped therebetween; the juxtaposed peripheral portions of the front housing, front stamping, and diaphragm are held in a clamped relationship by a split clamp 76; flange 14c of housing 14 is juxtaposed to flange 46c of rear stamping 46 with the periphery 18a of rear diaphragm 18 sandwiches therebetween; the juxtaposed peripheral portions of rear stamping 46, rear housing 14, and rear diaphragm 18 are permanently affixed in their clamped relationship by a rolled lip 78; primary actuator rod 30 is positioned in an atmospheric forward chamber 80 defined between the base portion 12a of the front housing and front diaphragm 16 with the front portion 30a of the rod passing slidably through a suitable aperture 12d in the base portion of the front housing; a front return coil spring 82 positioned in chamber 80 urges plate 32 against the central portion of front diaphragm 16; emergency actuator rod 24 is positioned in the pressurized chamber 82 defined between the rear stamping base portion 46 and rear diaphragm 18 with the front portion 34a of the rod passing slidably and sealingly through bushing bore 48d to position plate 36 in a pressurized chamber 85 defined between front diaphragm 16 and the base portion of front stamping 44; rear plate 38 is positioned against rear diaphragm 18 by a rear return coil spring 84 positioned in chamber 82 and acting to press plate 38 against diaphragm 18 with the front end 84a of the spring piloting around the circular series of clinch joints 56; bearing plate 22 is positioned in an atmospheric chamber 86 defined between rear diaphragm 18 and the base portion 14a of the rear housing with the hub portion 22a of the bearing plate centered on the central axis 88 of the booster and with the flange portion 22b of the bearing plate pressing against diaphragm 18; a strong emergency coil spring 90, sufficient to readily overcome return springs 82 and 84, is positioned in chamber 86 in surrounding relation to bearing plate hub portion 22a with the front end of the spring pressing against the rear face of bearing plate flange portion 22b and the rear end of the spring pressing against base portion 14a of rear housing 14; and bolt 40 of release tool assembly 26 is positioned in the transverse passage 92 defined between concave surfaces 44f/46f with the bolt precluded from axial movement within the passage at one end by the nut 42 and at the other end by diametrically opposed pins 40a projecting from the bolt.

Figure 3:
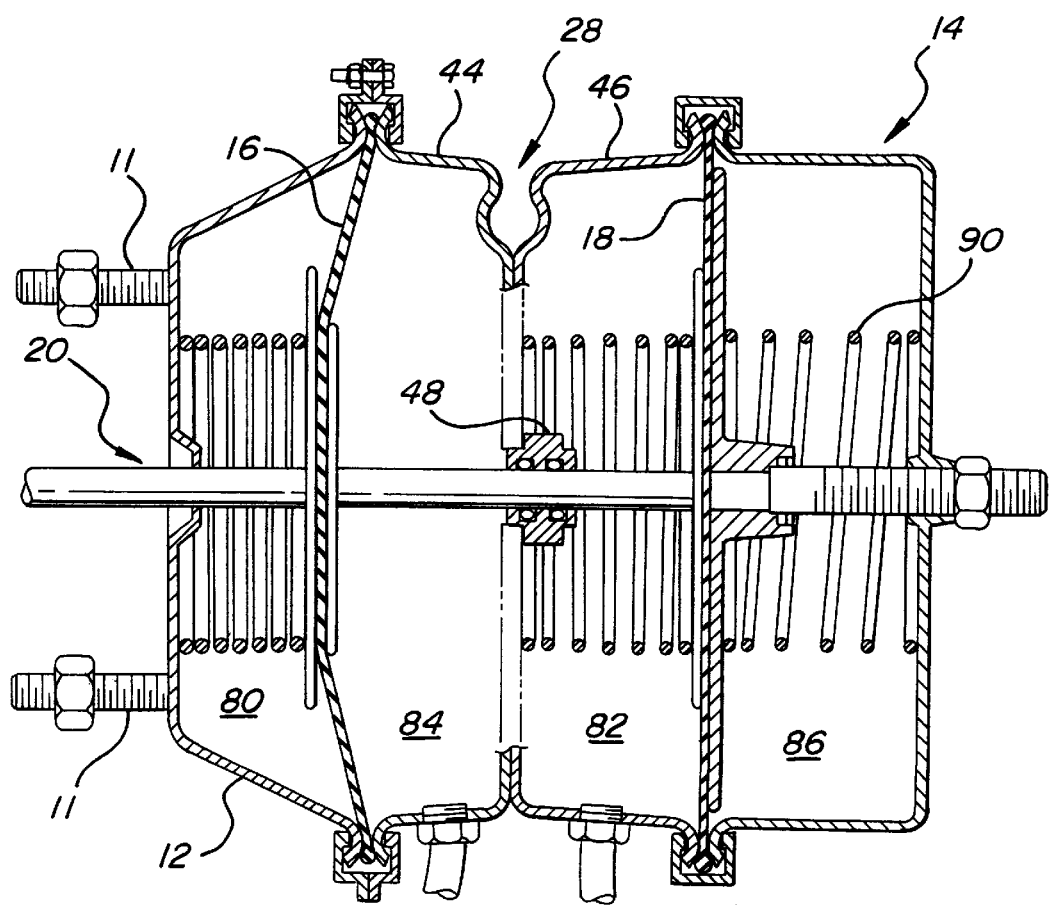
FIG. 3 is a cross-sectional view of the booster with the booster shown in a brake applied configuration.
Figure 2:
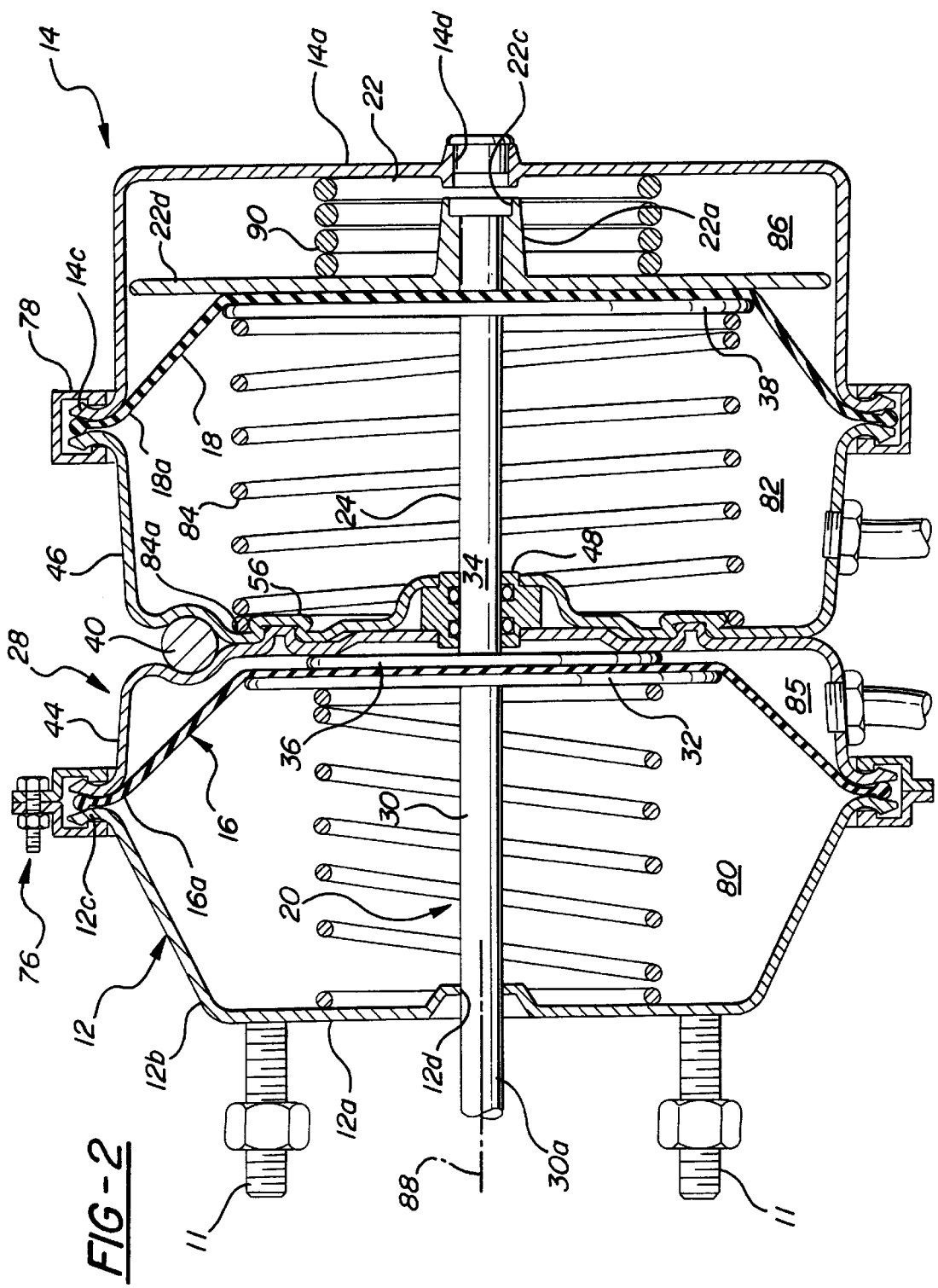
FIG. 2 is a cross-sectional view of the booster with the booster shown in a brake released configuration.
Figure 7:
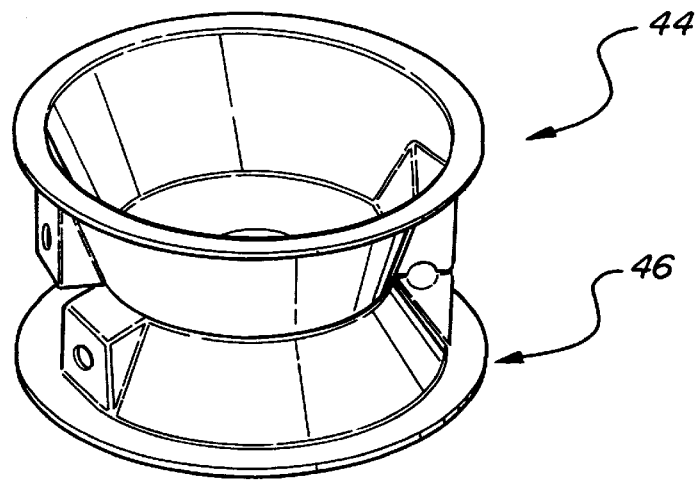
Figure 8:
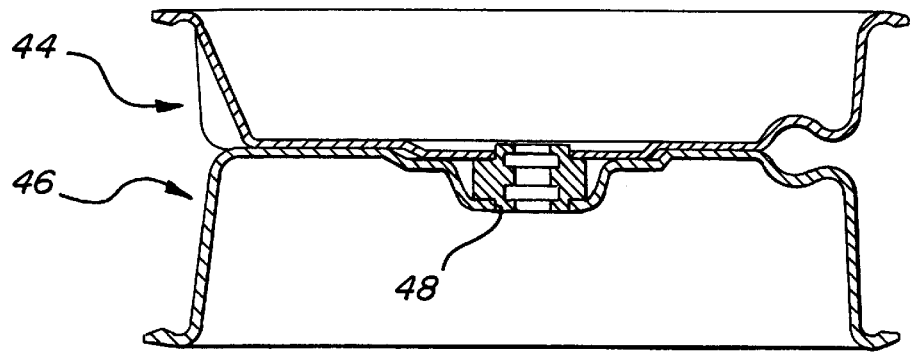
Figure 9:
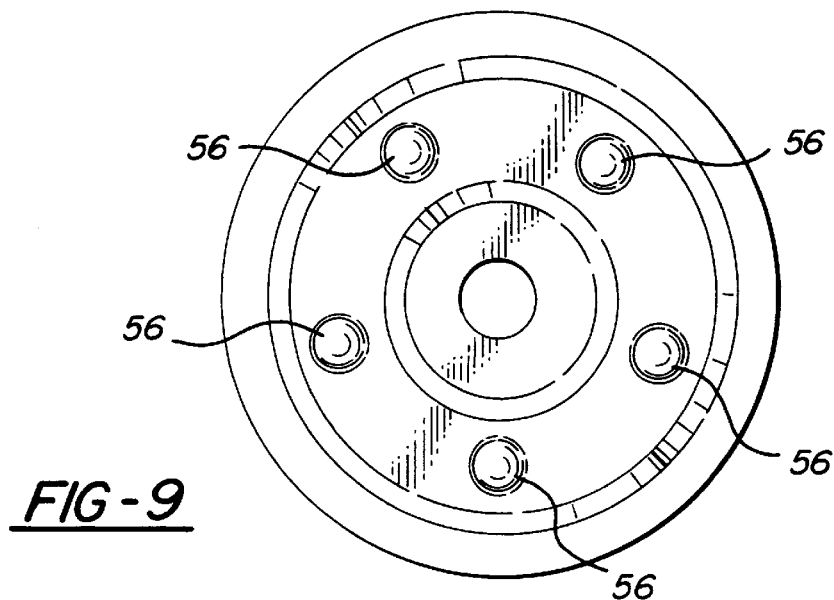

In operation, and with particular reference to FIGS. 2 and 3, in so long as pressurized air is maintained in the chamber 82 via a conduit 94 threadably connected to fitting 52, the powerful emergency spring 90 positioned in chamber 86 will be maintained in the compressed condition seen in FIG. 2 and, since the front plate 36 of the emergency actuator rod assembly 24 is not secured to diaphragm 16, diaphragm 16 is free to move in response to pressurized air admitted to chamber 84 via a conduit 96 threadibly connected to fitting 50 whereby to selectively move actuator rod 30 forwardly and rearwardly to selectably apply and release the brakes as required.

When it is desired to set the brakes as for parking, or in the event of a failure in the pressurized air system, the decreased pressure within chamber 82, resulting from deliberately exhausting air therefrom or from a failure in the air system, will enable the powerful spring 90 to urge the diaphragm 18 forwardly and move the front plate 36 of the emergency actuator rod assembly against diaphragm 16 to apply the brakes in the manner seen in FIG. 3.

In order for the driver to release the brakes when they are set in the condition seen in FIG. 3, and assuming that pressurized air is still available as in a typical parking situation, pressurized air is applied through conduit 94 and fitting 52 to bear against diaphragm 18 and move spring 90 back to its compressed, ready condition as seen in FIG. 2.

However, in the event that the emergency brake system has been actuated in response to a loss of pressurized air due to mechanical failure in the compressor or a leak in the hydraulic or pneumatic lines, the release tool assembly 26 may be utilized to release the brakes and allow the vehicle to be moved irrespective of the failure in the pneumatic or hydraulic system. Specifically, nut 42 is loosened to allow bolt 40 to be removed from passage 92, the bolt is passed forwardly through an aperture 14d in the base portion 14a of the rear housing to engage pins 40a with coacting notch means 22c at the rear end of the hub portion 22a of the bearing plate, and the nut is turned to pull the bolt rearwardly and pull the bearing plate rearwardly to compress the emergency spring, allow diaphragm 18 to move rearwardly with the release plate under the bias of return spring 84, and allow rod 30 to move rearwardly in chamber 80 under the bias of return spring 82 to release the brakes.

The invention will be seen to provide methodology and structure whereby the intermediate housing portion of the booster is provided in a manner to reduce the weight of the booster as well as the manufacturing cost of the booster without any sacrifice in the performance of the booster.

Whereas a preferred embodiment of the invention has been illustrated and described in detail it will be apparent that various changes may be made in the disclosed embodiment without departing from the scope or spirit of the invention.

What is claimed is:

1. A method of forming a motor vehicle brake booster including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housings; a bearing plate positioned in the rear housing having a rear face receiving a forward end of the emergency spring and a forward face bearing against a rear face of the rear diaphragm; an emergency brake actuator rod having a front end positioned forwardly of the central partition for coaction with a rear face of the front diaphragm, a rear end bearing against a forward face of the rear diaphragm, and an intermediate portion passing slidable through a central aperture in the central partition; and a return spring positioned between the central partition and the rear diaphragm in surrounding relation to the emergency brake actuator rod; the improvement wherein the intermediate housing is formed by the steps of:

shaping a first sheet of sheet metal to form a cup shaped rear sheet metal stamping having a rear base portion including a central aperture and a rear rim portion in surrounding relation to the rear base portion;

shaping a second piece of sheet metal to form a cup shaped front sheet metal stamping having a front base portion including a central aperture corresponding in size, placement, and configuration to the central aperture in the rear base portion and a front rim portion in surrounding relation to the front base portion;

positioning the base portions in confronting relation with the base portion central apertures aligned;

securing the base portions together to form the intermediate housing with the base portions coacting to define the central partition of the intermediate housing and the aligned base portion central apertures coacting to define the central aperture of the central partition;

providing a bushing sized to slidably receive the intermediate portion of the emergency brake actuator rod; and positioning the bushing in the aligned central apertures in the base portions of the stampings.

2. The method according to claim 1 wherein:

the formation of the front and rear sheet metal stampings includes the formation of a hole in the rim portion of each stamping; and the method includes the further steps of securing an annular fitting in the hole in the rim portion of each stamping.

3. A method according to claim 1 wherein:

the booster further includes an elongated tool adapted to pass through a central aperture in the rear housing for engagement with a rear end of the bearing plate; and the front and rear stampings coact when secured together to define a transverse passage proximate the periphery of the secured together stampings extending generally perpendicular to the central axis of the booster and sized to receive and store the elongated tool.

4. A brake booster including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housing; a bearing plate positioned in the rear housing having a rear face receiving a forward end of the emergency spring and a forward face bearing against the rear face of the rear diaphragm; an emergency brake actuator rod having a front end positioned forwardly of the central partition for coaction with a rear face of the front diaphragm, a rear end bearing against the forward face of the rear diaphragm, and an intermediate portion passing slidable through a central aperture in the central partition; and a return spring positioned between the central partition and the rear diaphragm in surrounding relation to the emergency brake actuator rod; the improvement wherein the intermediate housing comprises:

a cup shaped rear sheet metal stamping having a rear base portion including a central aperture and a rear rim portion in surrounding relation to the rear base portion;

a cup shaped front sheet metal stamping having a front base portion including a central aperture corresponding in size, placement, and configuration to the central aperture in the rear base portion and a front rim portion in surrounding relation to the front base portion;

means securing the base portions together in confronting relation to form the intermediate housing with the base portions coacting to define the central partition of the intermediate housing and the base portion central apertures aligned and coacting to define the central aperture of the central partition; and a bushing sized to slidably receive the emergency brake actuator rod positioned in the aligned central apertures in the base portions.

5. A booster according to claim 4 wherein:

a hole is provided in the rim portion of each stamping; and the booster further includes a pair of annular fittings each secured in a hole in the rim portion of a respective stamping.

6. A booster according to claim 4 wherein:

the booster further includes an elongated tool adapted to pass through a central aperture in the rear housing for engagement with a rear end of the bearing plate; and the front and rear stampings coact when secured together to define a transverse passage proximate the periphery of the secured together stampings extending generally perpendicular to the central axis of the booster and sized to receive and store the elongated tool.

7. A method of forming a motor vehicle brake booster including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housings; a bearing plate positioned in the rear housing having a rear face receiving a forward end of the emergency spring and a forward face bearing against a rear face of the rear diaphragm; an emergency brake actuator rod having a front end positioned forwardly of the central partition for coaction with a rear face of the front diaphragm, a rear end bearing against a forward face of the rear diaphragm, and an intermediate portion passing slidable through a central aperture in the central partition; and a return spring positioned between the central partition and the rear diaphragm in surrounding relation to the emergency brake actuator rod; the improvement wherein the intermediate housing is formed by the steps of:

shaping a first sheet of sheet metal to form a cup shaped front sheet metal stamping having a front base portion including a central aperture and a front rim portion in surrounding relation to the front base portion;

shaping a second piece of sheet metal to form a cup shaped rear sheet metal stamping having a rear base portion including a central aperture and a rear rim portion in surrounding relation to the base portion;

positioning the base portions in confronting relation; and securing the base portions together in a clinching operation to form the intermediate housing with the base portions coacting to define the central partition of the intermediate housing.

8. A method according to claim 7 wherein the clinching operation comprises forming a plurality of clinched joints in a generally circular configuration centered on the base portion apertures and having a diameter sized to pilot the front end of the return spring.

9. A method of forming a motor vehicle brake booster including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housings; a bearing plate positioned in the rear housing having a rear face receiving a forward end of the emergency spring and a forward face bearing against a rear face of the rear diaphragm; an emergency brake actuator rod having a front end positioned forwardly of the central partition for coaction with a rear face of the front diaphragm, a rear end bearing against a forward face of the rear diaphragm, and an intermediate portion passing slidable through a central aperture in the central partition; and a return spring positioned between the central partition and the rear diaphragm in surrounding relation to the emergency brake actuator rod; the improvement wherein the intermediate housing is formed by the steps of:

shaping a first sheet of sheet metal to form a cup shaped front sheet metal stamping having a front base portion including a central aperture and a front rim portion in surrounding relation to the front base portion;

shaping a second piece of sheet metal to form a cup shaped rear sheet metal stamping having a rear base portion including a central aperture and a rear rim portion in surrounding relation to the base portion;

positioning the base portions in confronting relation;

securing the base portions together to form the intermediate housing with the base portions coacting to define the central partition of the intermediate housing;

providing a bushing sized to slidably receive the emergency brake actuator rod;

positioning the bushing in the central apertures in the base portions of the stamping;

the base portions having a cross-sectional configuration such that, when positioned in confronting relation, a central region of the first stamping in surrounding relation to the first stamping base portion central aperture is positioned in axially spaced relation to a central region of the second stamping in surrounding relation to the second stamping base portion central aperture and annular regions of the first and second stamping base portions outwardly of the central region are contiguous;

the bushing spanning the axial space between the central regions of the stamping; and the base portions being secured together by clinch joints provided in the contiguous annular regions.

10. A brake booster including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housing; a bearing plate positioned in the rear housing having a rear face receiving a forward end of the emergency spring and a forward face bearing against the rear face of the rear diaphragm; an emergency brake actuator rod having a front end positioned forwardly of the central partition for coaction with a rear face of the front diaphragm, a rear end bearing against the forward face of the rear diaphragm, and an intermediate portion passing slidable through a central aperture in the central partition; and a return spring positioned between the central partition and the rear diaphragm in surrounding relation to the emergency brake actuator rod; the improvement wherein the intermediate housing comprises:

a cup shaped front sheet metal stamping having a front base portion including a central aperture and a front rim portion in surrounding relation to the front base portion;

a cup shaped rear sheet metal stamping having a rear base portion including a central aperture and a rear rim portion in surrounding relation to the base portion; and a plurality of clinch joints securing the base portions together in confronting relation to form the intermediate housing with the base portions coacting to define the central partition of the intermediate housing.

11. A booster according to claim 10 wherein the clinch joints are arranged in a generally circular configuration centered on the base portion apertures and having a diameter sized to pilot the front end of the return spring.

12. A brake booster including a front housing; a primary brake actuator rod slidable positioned in the front housing; a rear housing; an emergency spring positioned in the rear housing; an intermediate housing positioned between the front and rear housings and defining a central partition; a front diaphragm having a periphery clamped at the juncture of the front and intermediate housings and acting at a forward face thereof against a rear end of the primary actuator rod; a rear diaphragm having a periphery clamped at the juncture of the rear and intermediate housing; a bearing plate positioned in the rear housing having a rear face receiving a forward end of the emergency spring and a forward face bearing against the rear face of the rear diaphragm; an emergency brake actuator rod having a front end positioned forwardly of the central partition for coaction with a rear face of the front diaphragm, a rear end bearing against the forward face of the rear diaphragm, and an intermediate portion passing slidable through a central aperture in the central partition; and a return spring positioned between the central partition and the rear diaphragm in surrounding relation to the emergency brake actuator rod; the improvement wherein the intermediate housing comprises:

- a cup shaped front sheet metal stamping having a front base portion including a central aperture and a front rim portion in surrounding relation to the front base portion;
- a cup shaped rear sheet metal stamping having a rear base portion including a central aperture and a rear rim portion in surrounding relation to the base portion;
- means securing the base portions together in confronting relation to form the intermediate housing with the base portions coacting to define the central partition of the intermediate housing;
- a bushing sized to slidably receive the emergency brake actuator rod positioned in the central apertures in the base portions;
- the base portions having a cross-sectional configuration such that, when positioned in confronting relation, a central region of the front stamping in surrounding relation to the front stamping base portion central aperture is positioned in axially spaced relation to a central region of the rear stamping in surrounding relation to the rear stamping base portion central aperture and annular regions of the first and second stamping base portions outwardly of the central region are contiguous;
- the bushing spanning the axial space between the central regions of the stamping; and
- the base portions being secured together by clinch joints provided in the contiguous annular regions.

\* \* \* \* \*